(12) United States Patent
Tupper et al.

(10) Patent No.: US 6,570,370 B2
(45) Date of Patent: May 27, 2003

(54) APPARATUS FOR AUTOMATIC TUNING AND CONTROL OF SERIES RESONANT CIRCUITS

(75) Inventors: Christopher N. Tupper, Harpswell, ME (US); Duncan G. Wood, Harpswell, ME (US)

(73) Assignee: Raven Technology, LLC, Brunswick, ME (US)

(*) Notice: Subject to any disclaimer, the term of this patent is extended or adjusted under 35 U.S.C. 154(b) by 0 days.

(21) Appl. No.: 09/934,165

(22) Filed: Aug. 21, 2001

(65) Prior Publication Data

US 2003/0038613 A1 Feb. 27, 2003

(51) Int. Cl.[7] ............................................... G05F 1/12
(52) U.S. Cl. ...................................................... 323/293
(58) Field of Search ................................. 323/207, 208, 323/209, 222, 293, 352, 364

(56) References Cited

U.S. PATENT DOCUMENTS

| | | | |
|---|---|---|---|
| 5,047,913 A | * | 9/1991 | De Doncker et al. .......... 363/95 |
| 5,399,955 A | | 3/1995 | Glaser et al. |
| 5,561,349 A | * | 10/1996 | Hartai ..................... 315/209 R |
| 5,640,082 A | | 6/1997 | Lusher et al. |
| 6,051,959 A | | 4/2000 | Tupper |
| 6,108,000 A | | 8/2000 | Bolotski et al. |
| 6,111,770 A | * | 8/2000 | Peng ........................... 363/131 |
| 6,178,099 B1 | * | 1/2001 | Schutten et al. ............... 363/17 |

* cited by examiner

Primary Examiner—Matthew Nguyen
(74) Attorney, Agent, or Firm—Pierce Atwood

(57) ABSTRACT

An arrangement is disclosed to automatically match the resonant frequency of a series resonant circuit to an imposed operating frequency. A series resonant circuit is used to store or modulate magnetic energy or to generate high voltages. The circuit includes a capacitive element in series with an inductive element and voltage driving source. The capacitive element includes a base capacitance in parallel with a switch circuit that is in series with a trim capacitance. The switch circuit regulates the timing and direction of current through the trim capacitance. The capacitance of the capacitive element may be tightly controlled so that the resonant frequency may be closely regulated. A controller regulates the operation of the switch circuit and the voltage driving source as a function of sensed current through the resonant circuit and the driving frequency and amplitude to be matched.

24 Claims, 6 Drawing Sheets

APPARATUS FOR AUTOMATIC TUNING AND CONTROL OF SERIES RESONANT CIRCUITS

STATEMENT REGARDING FEDERALLY SPONSORED RESEARCH OR DEVELOPMENT

This invention was made with US Government support under contract DASG-60-00-C-0013 funded by the Ballistic Missile and Defense Organization of the Department of Defense.

BACKGROUND OF THE INVENTION

1. Field of the Invention

This invention relates generally to the tuning and operation of resonant electrical circuits and more particularly to an arrangement for solid state electronic controls to vary the capacitance in a series resonant circuit so that the resonant frequency of the circuit matches the imposed operating frequency.

2. Description of the Prior Art

Resonant circuits are variously used to store or modulate energy in magnetic fields, or to generate high voltages and electrostatic potential. Such circuits find use in radio technology, in electronic display technology, in induction heating systems and in power generation technology. Resonant circuits are extremely sensitive to frequency; component values must be closely matched to operating frequency or the resonant effect will be significantly diminished. Natural variation of component and circuit parameters due to aging, stray inductance, stray capacitance, circuit loading, or drifts in operating frequency present difficulties for keeping a resonant circuit tuned for maximum response.

Resonant electrical circuits contain, primarily, inductive and capacitive elements. The circuits are arranged so that energy is stored alternately in the magnetic field of the inductor and then in the electrostatic field of the capacitor. The stored energy shifts back and forth in a periodic fashion, ideally in a sinusoidal fashion. The resonant frequency depends on the values of the inductance and capacitance. Resonant circuits can be tuned by adjusting the values of the inductor and/or the capacitor. Variable capacitance can be used to tune a resonant circuit as is well known in radio technology and other arts. At power electronic levels, however, the radio techniques of varying capacitance become less practical.

A known technique to vary the capacitance is to add trim capacitors in parallel across the capacitive portion the circuit, as disclosed by Bolotski, et al. in U.S. Pat. No. 6,108,000. This technique generally has to be done with the circuit un-powered or as the capacitive element voltage crosses zero. These adjustments are limited to a discrete number of capacitor combinations available. Obtaining a range of resonant operating frequencies involves having a bank of many capacitors available and is difficult to coordinate with automatic control.

Lusher, et al., in U.S. Pat. No. 5,640,082 disclose a pulse width modulation (PWM) technique utilizing a solid state switch to dynamically vary the capacitance in a power filter arranged parallel to a DC load. This technique relies on one end of the switched capacitor being grounded. The pulse width modulation of the variable capacitor happens only on the positive phase of AC power input and is thus not suited by symmetry to use in shaping AC output waveforms.

Glaser, et al., in U.S. Pat. No. 5,399,955 disclose a technique utilizing pulse width modulation to dynamically vary the capacitance in a power filter which is arranged parallel to an AC power load. This technique utilizes two solid state switches and can be used in a symmetrical fashion to shape AC output waveforms. The solid state switches shown by Glaser, et al, introduce switching and resistive power losses that need to be minimized for use in resonant circuits. Resonant circuits are sensitive to all sources of power loss within the circuit. Resonant "quality" factor "Q" is defined as:

$Q=(2*pi)*$(peak energy stored per cycle)/(total energy dissipated per cycle).

Obtaining a high level of Q is an important efficiency and design feature of resonant circuits and unnecessary losses reduce the effective quality factor Q.

Glaser, et al., disclose no importance or restrictions on the timing of the pulse-width signals which enable capacitance to be added for the filter circuit operation. In series resonant circuits the voltages across the inductive and capacitive elements are naturally amplified to high levels and high levels of energy are stored within the circuit. For resonant circuit use it is important to prevent the trim capacitors from being added in parallel into the circuit at the time points when the voltage in the capacitor is different from the voltage of the circuit across the terminals to which it is being connected. If the capacitor at one voltage were allowed to connect in parallel with the circuit at a second, substantially different voltage, then large instantaneous "short circuit" currents would flow between the capacitor and the circuit. Such "short circuit" currents could easily reach destructive levels and damage equipment, and such currents would generate a broad spectrum of undesirable radio frequency noise.

Because resonant circuits are excellent narrow band filters centered on the resonant frequency, it is possible to stimulate resonant behavior of a series resonant circuit by the application of driving voltages using non-sinusoidal waveforms; despite the non-sinusoidal stimulation the resonant behaviors, current waveform, and energy storage patterns of the circuit remain predominantly sinusoidal at the excitation frequency. This feature may be exploited to allow a single sided DC voltage source to be used to stimulate the resonant circuit with rectangular pulses. Better, more sinusoidal waveforms are obtained if the excitation is symmetrical with respect to positive and negative portions of the cycle, and this may be accomplished by adding an H-bridge commutation circuit. The amplitude of the resonant response depends upon a complex interaction between the amplitude of the excitation and the relationship between the excitation frequency and the resonant frequency of the circuit. For a highly tuned resonant circuit a small misalignment between the excitation frequency (operational frequency) and resonant frequency leads to a substantial drop in resonant behavior and energy storage levels. Pulse width modulation techniques may be added to the rectangular pulses of the commutation circuit to provide control of the effective amplitude of excitation and thus resonant behavior. Tupper, in U.S. Pat. No. 6,051,959, shows an example of such an arrangement as applied to the excitation of the field of a high frequency alternator.

When a single sided DC supply is used with a commutation circuit to provide symmetrical excitation to a series resonant circuit, neither end of the capacitor is consistently at the ground reference. This introduces difficulties in activating solid state switches to control the variable capacitors by PWM techniques such as those cited.

Series resonant circuits generate high (amplified) voltages with a modest series current. This is useful in situations where driving current sources are limited and high voltages are tolerable or desirable. These high voltages (Q times the driving voltage) appear across both the inductor and the capacitor. Such high voltages create difficulties in measuring the zero crossing of the capacitor voltage in order to synchronize the pulse width modulation adjustment of capacitance. The presence of these high voltage signals among the usually low voltage control signals presents possible safety hazards that need to be minimized.

OBJECTS OF THE INVENTION

It is an object of the current invention to provide means to tune a series resonant circuit so that it's natural frequency matches an imposed excitation (operating) frequency.

It is an object of this invention to provide for a continuously variable range of natural frequencies between a maximum and minimum while using a minimum of components and switches. It is a further objective of the current invention to provide for dynamic adjustment and tuning of a resonant circuit in a fashion that is suitable for automatic control. It is a further object to provide this continuous control while eliminating the possibility of creating short circuits and damaging currents during switching and while minimizing the generation of unwanted radio frequency noise.

It is an object of the current invention to minimize the need for high voltage signals to be present in the control system.

It is an objective of this invention to minimize resistive and switching losses.

It is a further object of this invention to provide means to control the amplitude of the resonant response of the resonant circuit powered by a single sided DC supply and to strive for a resonant response that approaches a sinusoidal waveform at the excitation frequency.

SUMMARY OF THE INVENTION

The objects set forth as well as further and other objects and advantages of the present invention are achieved by the embodiments of the invention described herein below. The present invention includes a series resonant circuit that includes a series capacitive element and an inductive element in series with each other and together in series with a voltage driving source. The series capacitive element includes a base capacitor in parallel with a trim capacitor circuit. The trim capacitor circuit includes a capacitor in series with an switch circuit which can provide electronic control of the timing and direction of the current allowed to flow through the trim capacitor.

The switch circuit is powered or enabled by a floating voltage source and is controlled by phase modulated tuning signals from a control system. The phase modulated tuning signals are timed to allow conduction through the switch circuit in such a way that allows the trim capacitor to be added in parallel to the base capacitor for specific portions of the resonant response cycle and to be essentially disconnected from the base capacitor during the other portions of the resonant cycle. The phase modulated tuning signals are arranged to allow conduction through the trim capacitor to be initiated only by natural commutation when the voltage in the trim capacitor and the voltage in the base capacitor are essentially equal. This natural commutation prevents sudden discharge of current between the capacitors and helps prevent destructive current levels and the generation of undesirable radio frequency noise. Adjustment of the delay, or phase angle, of these tuning signals relative to the time of the zero crossing of the series resonant current allows the effective capacitance of the capacitive element, as seen by the resonant circuit over the course of a resonant cycle, to be varied in a continuous way between the value of the base capacitor and the value of the base capacitor plus the parallel trim capacitor. In turn, this adjusts the natural resonant frequency of the series resonant circuit.

The voltage driving source includes a single sided DC power supply, such as a battery, an H-bridge circuit to provide commutation of the polarity driving voltage at a desired operating frequency, and a control circuit to provide pulsewidth-modulation signals to the drive to control the effective magnitude of the excitation. The drive also includes arrangements to allow low-loss free-wheeling currents during unexcited portions of the PWM drive cycle. A current detector provides an indication of, at least, the direction of the total series current flow in the resonant circuit. A phase detection circuit provides a signal indicating the phase difference between the driving voltage and the total series current in the resonant circuit. A control system integrates the phase difference signal and provides an integrated error signal, which is used to control the timing of the phase modulated tuning signals and thus the capacitance of the capacitive element of the resonant circuit and thus the resonant frequency. The control circuit is arranged to stabilize when the driving voltage and resonant current are in phase, thus providing auto-tuning operation. The control circuit also adjusts the PWM circuit to maintain the amplitude of the resonant response at a desired point.

DETAILED DESCRIPTION OF THE PREFERRED EMBODIMENT

Figure 1:
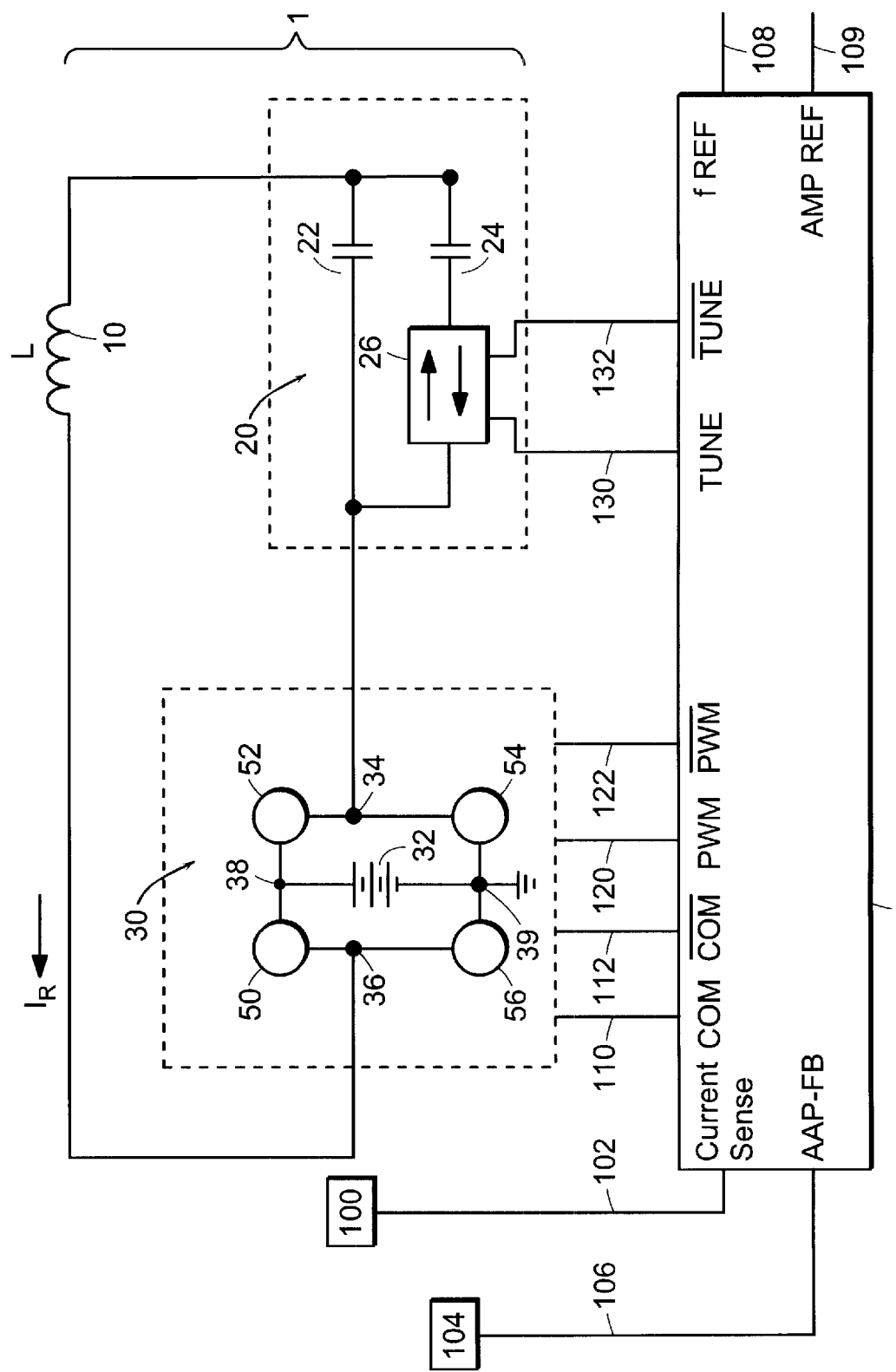
FIG. 1 presents an overview schematic of the resonant series circuit and its control system.

As shown in FIG. 1, a series resonant circuit 1 of the present invention includes an inductive element 10 in series with a series capacitive element 20 and together these are in series with a driving voltage source 30. Resonant series current "Ir" circulates in this circuit and is sensed by sensor 100 to provide current sense signal 102 to a control circuit 40. The amplitude of some desired parameter of resonant performance, such as energy storage, magnetic field strength or electrostatic potential, is measured by sensor 104 which creates signal 106 to the control circuit 40. For example, in application to the technology of the above-mentioned U.S. Pat. No. 6,051,959 sensor 104 would measure system output voltage that is modulated by the magnetic field intensity in the alternator field.

Series capacitive element 20 includes a base capacitor 22 that always allows a conduction path for the resonant current Ir. Connected in parallel with base capacitor 22 is the series combination of trim capacitor 24 and switch circuit 26. Switch circuit 26 is electronically controlled to allow current to flow in either one direction or the other; this control is effected by tuning signals 130 and 132.

Driving voltage source 30 includes a DC power source 32, typically a battery, and an H-bridge commutation circuit made up of controllable switches 50, 52, 54, and 56 which may be FET devices as shown or SCR devices or IGBT devices or other controllable switches known in the art of solid state switches. The voltage end of DC power source 32 is connected to ground and to the "negative" terminals of solid state switches 54 and 56 at interconnection 39. The high voltage end of DC power source 32 is connected to the "positive" terminals of solid state switches 50 and 52 as shown at interconnection 38. Controllable switches 52 and 54 are interconnected at point 34 and controllable switches 50 and 56 are interconnected at point 36 to form a well known H-bridge configuration. Commutation signals 110 and 112 and pulse-width-modulation signals 120 and 122 are provided by the control circuit 40 to control the polarity and duration of power source connections (driving voltage pulses) applied to resonant circuit 1. This allows control of phase and amplitude of the resonant circuit response. As will be detailed later, provisions are made to allow the resonant circuit current Ir to circulate through low-loss free-wheeling paths within driving voltage source 30 during those times when the pulse width modulation control has disconnected the power from the series circuit. For proper operation it is important to maintain a series conduction path through the resonant circuit at all times. Low losses are critical to the performance of a resonant circuit, directly influencing its voltage amplification property (Q) and bandwidth.

Control circuit 40 also requires some frequency reference signal 108 to be matched, such as a sample of line frequency from the grid; this signal may be provided externally or generated internally. Furthermore, control circuit 40 also requires some resonant amplitude reference signal 109 to be matched, such as a sample of 120 volt RMS line voltage amplitude; this signal may be provided externally or generated internally.

Figure 2:
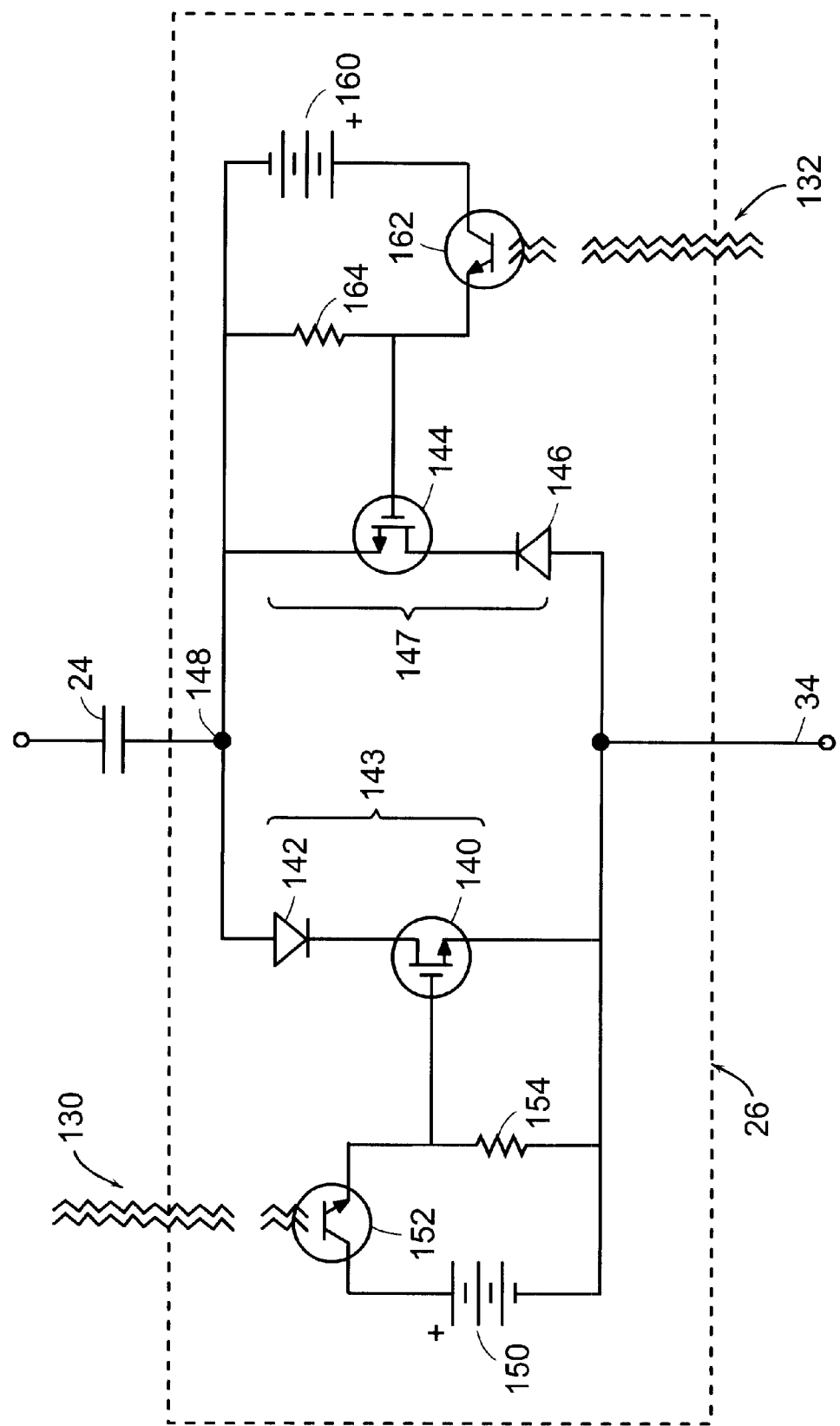
FIG. 2 presents a schematic of a first embodiment of a switch circuit.

FIG. 2 shows a preferred embodiment of switch circuit 26. Connection point 34, which is common with driving voltage source 30 is connected through two parallel circuits (more precisely called "anti-parallel" circuits) to connection point 148 which is connected to one end of trim capacitor 24. The first unidirectional conduction path 143 includes a diode 142 in series with switch 140 (here shown as a N-channel enhancement mode FET) arranged so that when switch 140 is in conductive mode current may pass from node 148 to node 34, but not in the reverse direction through this path. The second unidirectional conduction path 147 includes a diode 146 in series with switch 144 (here shown as a N-channel enhancement mode FET) arranged so that when switch 144 is in conductive mode current may pass from node 34 to node 148, but not in the reverse direction through this path. N-channel FETs are shown because of the relatively low resistance they offer when activated. Other solid state switch devices such as bi-polar transisitors or IGBT or thyristor devices may be used. In each path the series resistance of the FET and the diode voltage drop remove power from whatever current passes through the path. This lost power reduces the Q of the resonant system and should be minimized. Since nodes 148 and 34 vary in voltage as the circuit is operated, separate floating power supplies are shown for enabling switches 140 and 144. The gate of switch 140 is connected via resistor 154 to node 34. The negative end of floating voltage source 150 is also connected to node 34. This floating voltage supply might be a battery or a photo-voltaic source or bootstrapping capacitor arrangement, as is well known. An optically operated switch 152, which may be a phototransistor as shown, is connected between the positive end of floating voltage source 150 and the gate of switch 140. When enabled by tuning signal 130, here shown as an optical pulse, switch 152 allows current to pass through resistor 154 increasing the gate voltage, relative to node 34, thus turning on switch 140. When not enabled by tuning signal 130 the gate voltage of switch 140 falls, blocking current flow through switch 140.

In similar fashion the gate of switch 144 is connected via resistor 164 to node 148. The negative end of floating voltage source 160 is also connected to node 148. This floating voltage supply might be a battery or a photo-voltaic source or bootstrapping capacitor arrangement as is well known. An optically operated switch 162, which may be a phototransistor as shown, is connected between the positive end of floating voltage source 160 and the gate of switch 144. When enabled by tuning signal 132, here shown as an optical pulse, switch 162 allows current to pass through resistor 164 increasing the gate voltage, relative to node 148, thus turning on switch 144. When not enabled by tuning signal 132 the gate voltage of switch 144 falls, blocking current flow through switch 144. Switches 140 and 144 and diodes 142 and 146 must be capable of blocking the full resonant voltage which may appear across base capacitor 22. The selection of tuning signal 130 or 132 allows current to flow in one direction or the other through switch circuit 26.

Figure 3:
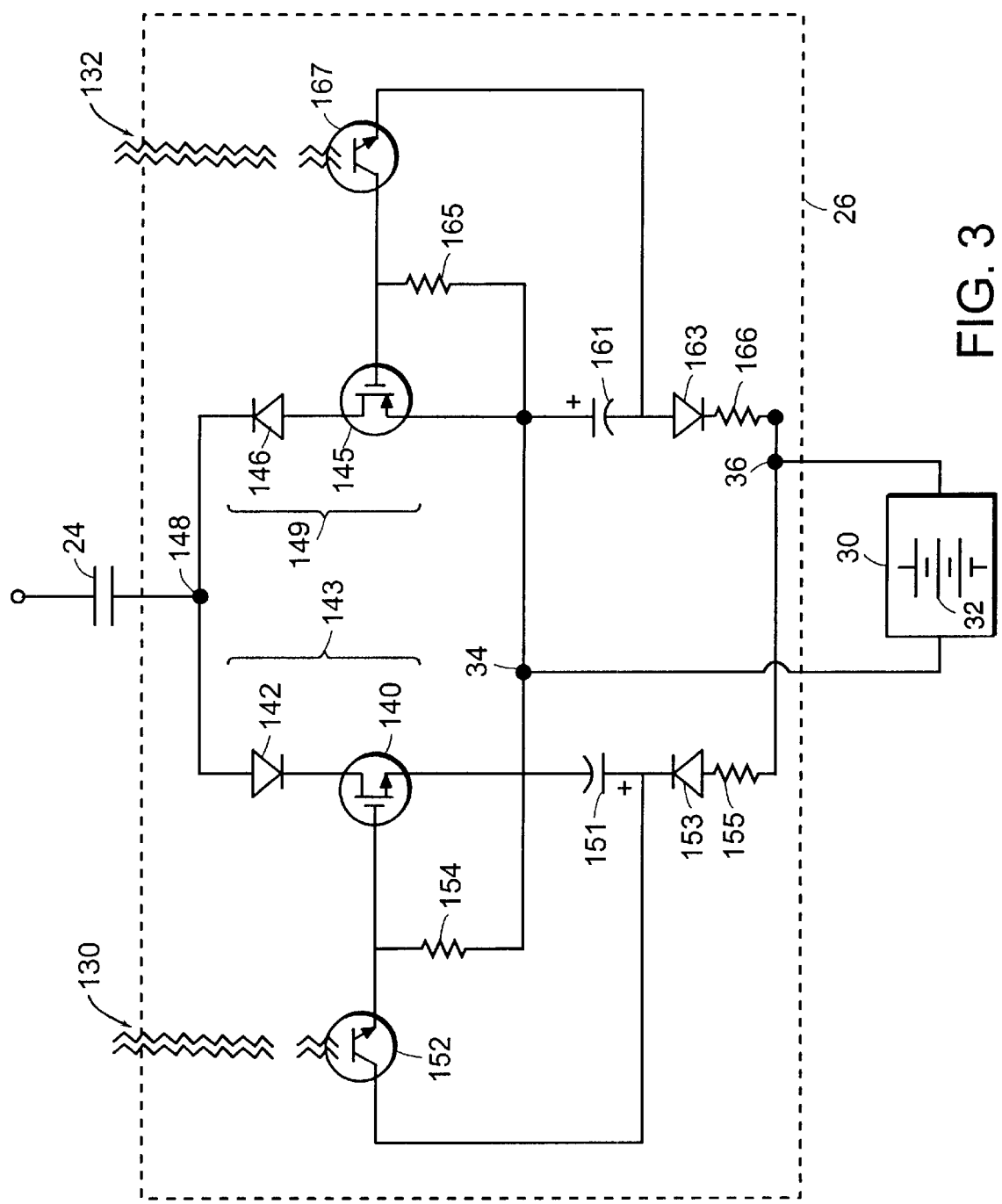
FIG. 3 presents a schematic of a second embodiment a switch circuit.

FIG. 3 shows a second embodiment of switch circuit 26 and illustrates application of the well known bootstrapping approach to provide a low cost solution to providing the floating power sources needed for the operation of the switches. In this embodiment the enabling voltage sources are automatically charged by the operation of driving voltage source 30. In path 143 switch 140 and diode 142 are arranged between nodes 148 and 34 as before. The gate of switch 140 is again connected to node 34 by resistor 154. The negative end of capacitor 151 is also connected to node 34. The cathode of diode 153 is connected to the positive end of capacitor 151, while the anode is connected to node 36 through current limiting resistor 155. Driving voltage source 30 applies pulses of DC voltage across nodes 34 and 36, the polarity of the pulses vary with the commutation signals. Pulses in which node 36 is positive with respect to node 34 will tend to charge capacitor 151 through diode 153 up to almost the voltage of the driving DC source 32. Switch 152 is connected between the positive end of capacitor 151 and the gate of switch 140. As before, the voltage of the gate of switch 140 will rise when tuning signal 130 enables conduction in switch 152 and this will enable current to flow through switch 140.

In this embodiment the second path is shown as 149. Switch 145, shown as a P-channel enhancement mode FET, is connected in series with diode 146 between nodes 34 and 148. The gate of switch 145 is connected to node 34 via resistor 165. The positive end of capacitor 161 is also connected to node 34. The anode of diode 163 is connected to the negative end of capacitor 161, while the cathode is connected to node 36 though current limiting resistor 166. Driving voltage source 30 applies pulses of DC voltage across nodes 34 and 36; the polarity of the pulses vary with the commutation signals. Pulses in which node 36 is negative with respect to node 34 will tend to charge capacitor 161 through diode 163 to almost the voltage of the driving DC source 32. Switch 167 is connected between the negative end of capacitor 161 and the gate of switch 145. The voltage of the gate of switch 145 will fall relative to node 34 when tuning signal 132 enables conduction in switch 167 and this will enable current to flow through switch 145.

Selection of tuning signal 130 or 132 will allow current to flow though trim capacitor 24 in a specific direction. Adjusting the phase angle of tuning signals 130 and 132 relative to the resonant current, Ir, adjusts the amount of current flowing into and out of trim capacitor 24 over the course of a resonant cycle. This operation varies the effective capacitance of trim capacitor 24, and thus the effective capacitance of series resonant capacitve element 20.

Base capacitor 22 provides a lower limit of circuit capacitance. If the value of inductive element 10 is fixed, adding additional capacitance will decrease the natural frequency (fo) of the resonant system. The formula for this is $$fo=1/(2*pi*SQUARE\text{-}ROOT(L*C))$$

where L is inductance (Henrys), and C is capacitance (Farads), and fo is natural frequency in Hz.

As tuning signals 130 and 132 are phase modulated to allow current to flow into trim capacitor 24 for a greater portion of the resonant cycle, the effective capacitance is increased and the natural frequency of the circuit is tuned to a slower frequency. It should be noted that current that flows into trim capacitor 24 suffers power loss in the switches and diodes of switch circuit 26, while current that flows through the base capacitor 22 does not. The instantaneous current will split between the two capacitors (22 and 24) in direct proportion to their capacitance. The power loss in switch circuit 26 should be minimized by tuning the device as closely as possible with base capacitor 22 and using as small a trim capacitor as possible while allowing enough trim capacitance to obtain the required dynamic range of natural frequencies.

Figure 4:
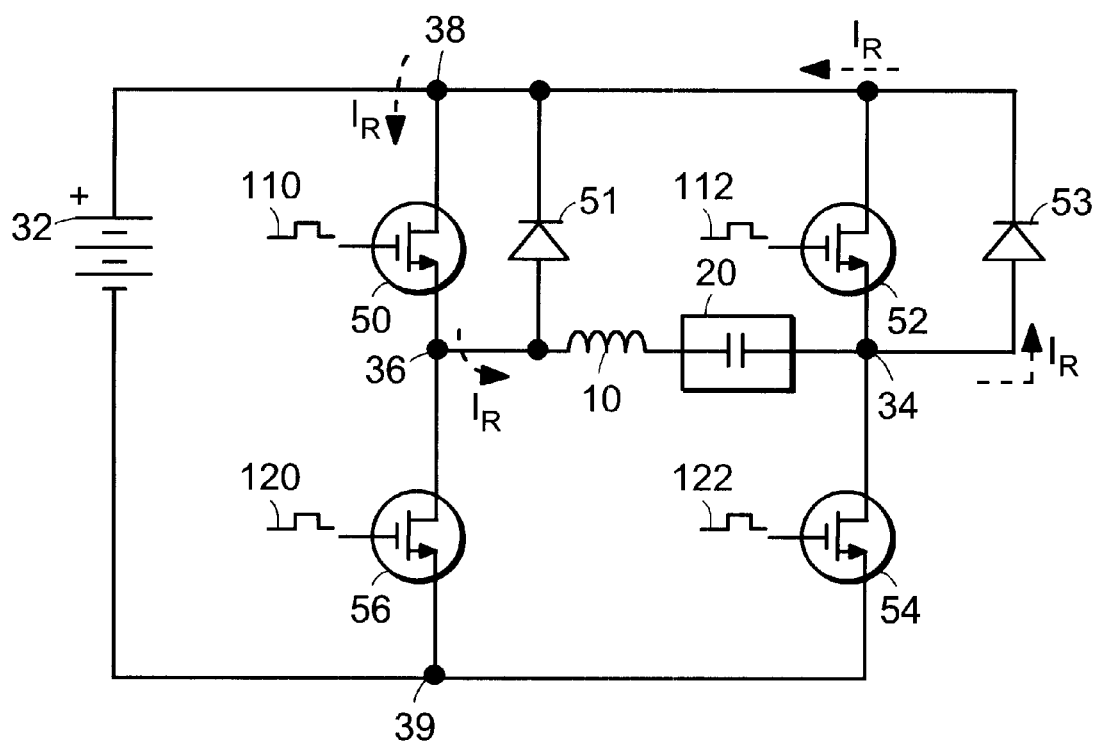
FIG. 4 presents a schematic of a driving voltage source.

FIG. 4 shows a schematic diagram of one embodiment of driving voltage source 30, detailing the low-loss free wheeling paths that allow the resonant circuit current, Ir, to circulate through the driving voltage source even when the DC power source 32 has been removed from the series circuit by the PWM controls. Switches 50, 52, 54 and 56 are connected in a well known H-Bridge configuration. They are shown here as FET switches but may be SCR devices or IGBT devices or other controllable switches. Commutation signals 110 and 112 are complementary square waves so that either one (and only one) of switches 50 or 52 are enabled. PWM signals 120 and 122 are arranged to enable switches 54 or 56 with pulse width modulated rectangular pulses. Control signals are interlocked so that signals 110 and 120 may not be simultaneously activated creating a short circuit across the DC power source 32. Similarly control signals are interlocked so that signals 112 and 122 may not be simultaneously activated creating a short circuit across the DC power source 32. Diode 51 is connected anode to node 36 and cathode to node 38. Diode 53 is connected anode to node 34 and cathode to node 38. In many FET switches these so called free-wheel diodes are an inherent part of the device. If other devices are used, provisions must be made to insure that diodes 51 and 53 are functionally present.

In operation the commutation signals enable either switch 50 or 52 during the positive half cycle of the resonant response. Assuming switch 50 is enabled, then switch 54 is alternately enabled and disabled by PWM control signal 122. When switch 54 is enabled current will flow through the DC power source 32, to node 38, through switch 50 to node 36, though the inductive element 10 and capacitive element 20 to node 34, through switch 54 to node 39 and back to the DC power source 32. Power is provided to the resonant circuit and energy is stored in the inductive element 10 and the capacitive element 20. When switch 54 is disabled, current will flow from node 38, through switch 50 to node 36, though the inductive element 10 and capacitive element 20 to node 34, through the free wheel path provided by diode 53 back to node 38. Power is taken from the inductive element 10 and the capacitive element 20 and lost in the resistive and diode voltage drops in the freewheel path. These losses should be minimized in order to preserve good resonant response within the circuit. Switch 52 is enabled during the negative half cycle of the resonant response and a similar operation exists with PWM conduction through switch 56, but in this case the polarity of the driving voltage applied to the inductive element 10 and to the capacitive element 20 are reversed.

Figure 5:
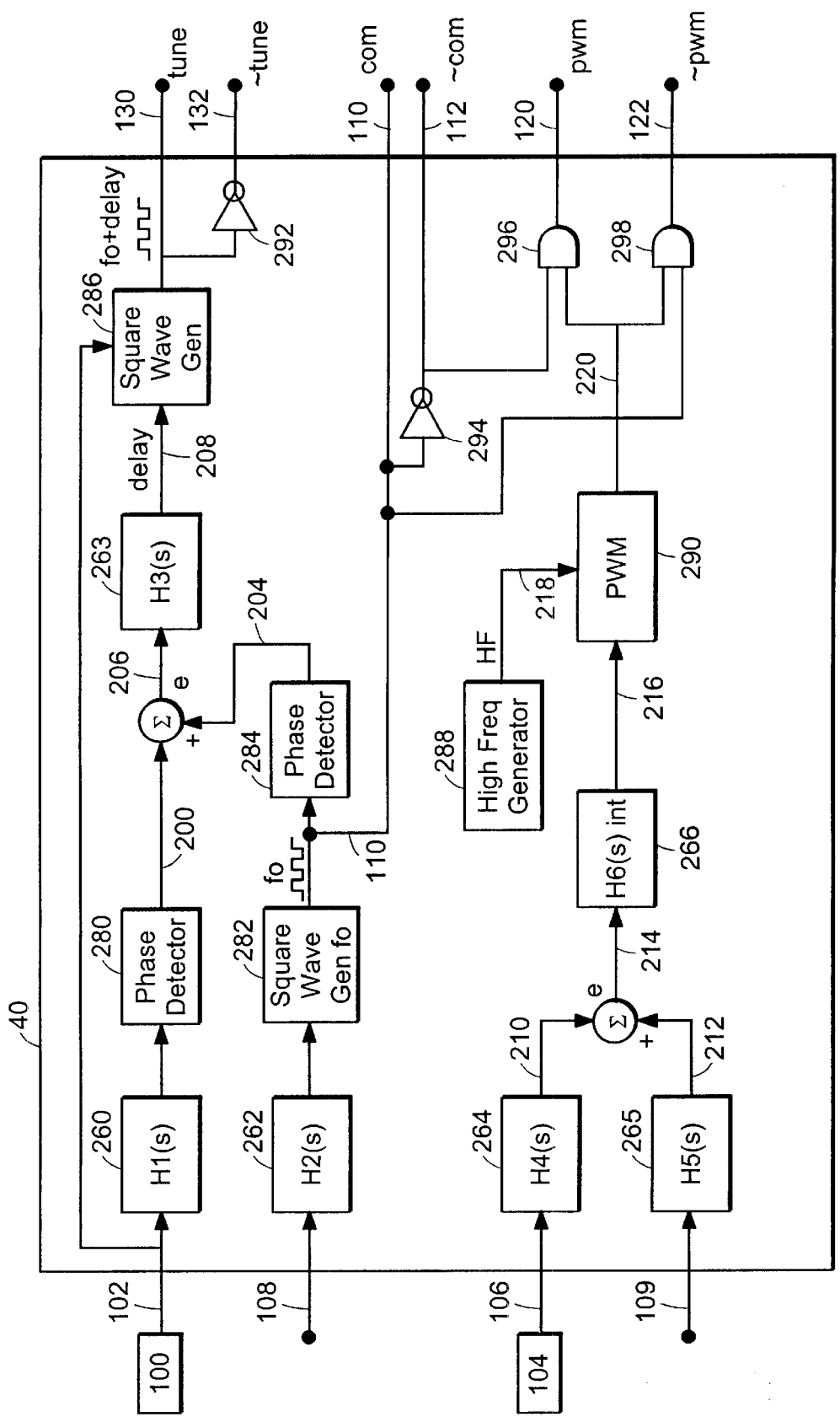
FIG. 5 presents a schematic of a control system.

FIG. 5 shows a schematic diagram of control system 40. Frequency reference signal 108, which may be internally or externally generated, sets the command level for the desired operation frequency of the resonant circuit 1. The signal 108 may be a DC command voltage or a sine wave to be followed in both frequency and phase. Signal 108 is conditioned as necessary by transfer function block 262 and converted to a square wave signal 110 of the desired operating frequency and phase relation to signal 108. A typical arrangement for such operations might use a phase lock loop logic chip such as CD4046. Signal 110 is then processed by a phase detector 284 that produces signal 204 indicative of the phase of signal 110.

Current sensor 100, which typically might be a Hall effect sensor, produces current sense signal 102 which is processed by transfer block 260 and phase detector 280 to produce phase signal 200 indicating the instantaneous phase of series resonant current Ir. Signal 200 is added as negative feedback to signal 204, by means well known in control systems, to produce phase error signal 206 indicative of the phase error between the series resonant current and the square wave signal 110. Square wave signal 110 and its complementary square wave signal 112, formed by processing signal 110 through inverter element 294, are used as the commutation signals for the voltage driving source 30. Therefore, signal 204 represents the phase of the driving voltage. Signal 206 represents the phase error between the driving voltage and resonant series current. At resonant operation this phase error should be zero.

The phase error signal 206 is processed by transfer block 263, which includes an integration effect, so that signal 208 represents an integrated error signal. Signal 208 acts as a delay command and block 286 uses the delay command and current sense signal 102 to create a phase modulated tuning signal 130 at the same frequency as square wave 110 but delayed behind resonant series current Ir by a delay proportionate to signal 208. This signal 130 represents the tuning signal command for the switch circuit 26. The tuning command 130 is inverted by element 292 to produce is its complementary phase modulated tuning signal 132. Signals 130 and 132 may be further processed by well known techniques into optical signals for coupling to switch-circuit 126 as needed. The delay in the phase modulated tuning signals 130 and 132 controls the portion of the resonant cycle in which each path, 143, 147 (or 149) is enabled. In turn, this controls when the trim capacitor 24 is effectively connected to the series circuit, and thus controls the capacitance of the resonant circuit 1. As the capacitance of the series circuit changes, the phase angle between the series resonant current Ir and the driving voltage (110) will also change. The negative feedback arrangement described here will stabilize when the phase angle reaches zero and the circuit is operating at peak resonance.

In an alternate embodiment, element 286 may use the phase of square wave signal 110, or a derivative, together with delay signal 208 to generate tuning signal 130.

Amplitude reference signal 109, which may be internally or externally generated, is processed by transfer block 265 to produce amplitude command signal 212. Amplitude sensor 104 produces amplitude signal 106 which is processed by transfer block 264, which for the instance of U.S. Pat. No. 6,051,959 might include rectification and low pass filtering to produce amplitude feedback signal 210.

Amplitude feedback signal 210 is added as negative feedback to amplitude command signal 212, by means well known in control systems, to produce amplitude error signal 214 indicative of the amplitude error. The amplitude error signal 214 is processed by transfer block 266, which includes an integration effect, so that signal 216 represents an integrated error signal. Signal 216 acts as a pulse-width command. Triangle generator 288 produces a high frequency triangle signal 218 which has a frequency several times faster (typically 5–50 times faster) than the desired resonant frequency set by commutation signal 110. Pulse width modulator block 290 uses the pulse-width command signal 216 plus high frequency triangle signal 218 to produce a high frequency series of rectangular pulses, signal 220 where the pulse width is proportionate to pulse-width command 216 and the high frequency is established by the triangle wave. The pulse train 220 is processed by simple logic, shown in elements 294, 296 and 298 to produce the PWM signals 120 and 122, which are used by the voltage driving source 30. This and similar techniques are well known in the art as are digital counter methods for establishing pulse-width modulation signals. The pulse width controls the proportion of the cycle during which the DC power source 32 is coupled to the series resonant circuit, and thus controls the average excitation level and the resulting amplitude of resonant response. The negative feedback circuit described here will stabilize when there is no error between the amplitude command signal and the amplitude feedback signal.

Figure 6:
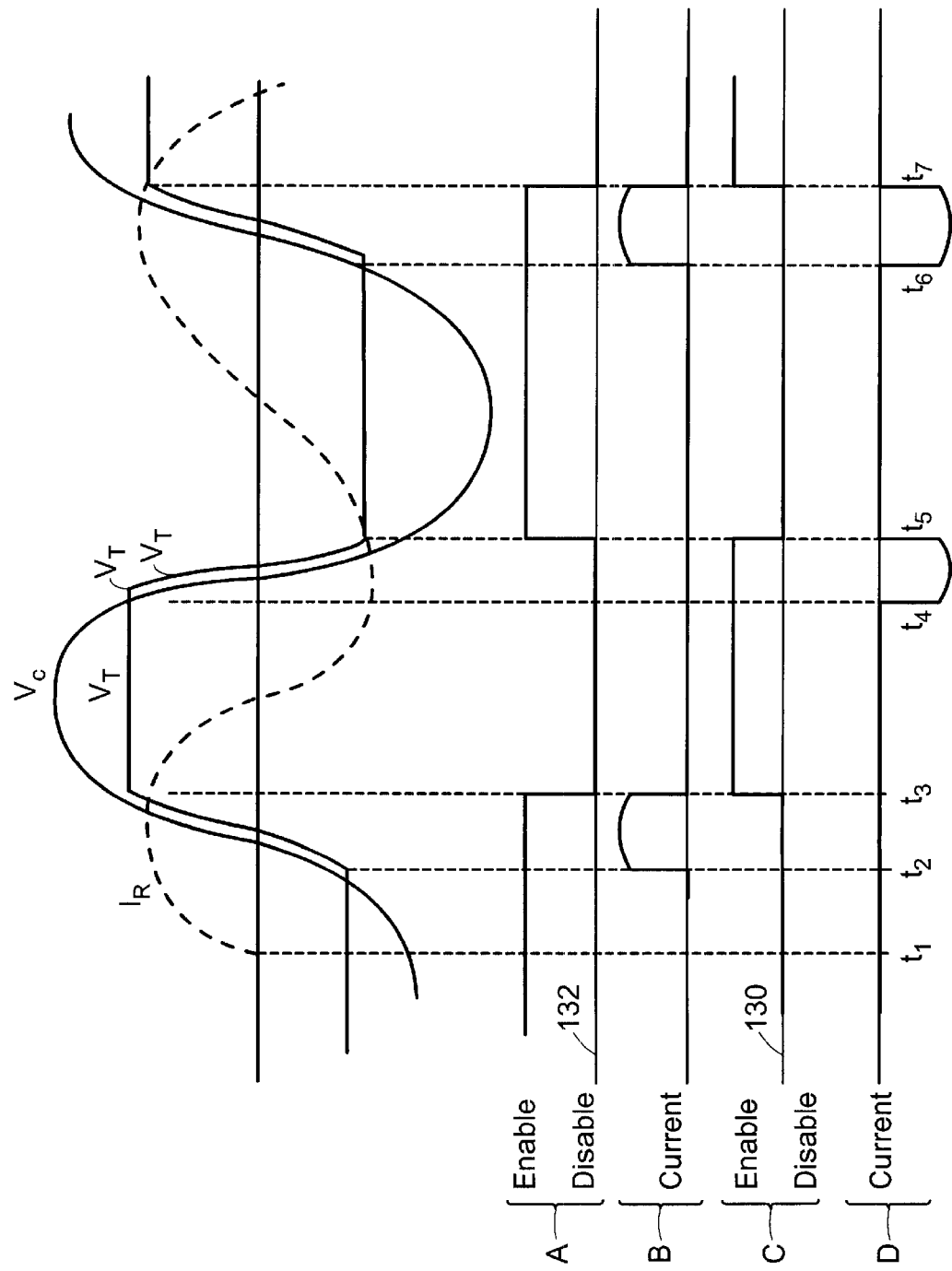
FIG. 6 presents a stacked waveform diagram for operation of a trim capacitor section and the switch circuit.

FIG. 6 presents a stacked waveform diagram for operation of the trim capacitor section 20 and switch circuit 26 as presented in the embodiment of FIG. 2. The dotted sine wave represents the series resonant current Ir and is shown with a zero crossing at time t1. The voltage across the base capacitor 22 is marked as sine wave Vc and follows 90 degrees (one quarter cycle) behind current Ir. The voltage across the trim capacitor is shown in truncated wave Vt, which slightly lags Vc due to diode drops. Below that, the waveform marked A is plotted on the same time base and shows the phase modulated tuning signal 132, which enables switch 144, is shown, initially enabled. Below that is the waveform marked B, a plot of the instantaneous current through switch 144. Below that the waveform marked C shows the (complementary) phase modulated tuning signal 130, which enables switch 140 is shown, initially disabled. On the bottom is the waveform marked D which shows the current through switch 140. In this embodiment phase modulated tuning signals 130 and 132 are complementary square waves (50 percent duty cycle). At the point t2 the voltage Vc rises to one diode drop above the voltage Vt, so current begins to flow, by natural commutation, through diode 146 and switch (transistor) 144. This continues until signal 132 is disabled at time t3 and signal 130 is enabled. At this time current flow through switch 144 stops. Base capacitor voltage Vc continues to rise due to the inflow of current Ir into capacitor 22. Meanwhile, diode 142 blocks current flow through the trim capacitor 24, so Vt remains constant with time following time t3. At time t4 voltage Vc drops to one diode drop below the voltage Vt, so current begins to flow, by natural commutation, through diode 142 and switch (transistor) 140, which is still enabled by signal 130. This continues until signal 130 is disabled at time t5 and signal 132 is enabled. Current flow through switch 140 stops. Base capacitor voltage Vc continues to fall due to the outflow of current Ir from capacitor 22. Meanwhile diode, 146 blocks current flow through the trim capacitor 24, so Vt remains constant with time following time t5. At time t6 the cycle starts to repeat.

The time interval between t1 and t3 is the delay of the phase modulated tuning signals 130 and 132 relative to the zero crossing of the current, Ir. This delay must be between the limits of ¼ and ½ of one resonant cycle. Increasing the delay between the limits of ¼ and ½ of one resonant cycle increases the amount of current that is allowed into the trim capacitor 24 during each cycle which, in turn, increases the effective capacitance of capacitive element 20. In effect the controlled delay of phase modulated tuning signals 130 and 132 provides control of the "disable point" for current flow into trim capacitor 24; natural commutation automatically adjusts for the proper discharge time for the trim capacitor 24. The charge and discharge times are balanced symmetrically in phase with the resonant voltage Vc. This symmetry and phase relationship assists in maintaining a near sinusoidally shaped resonant response.

It is important to note that the operation described in FIG. 6 does not allow the trim capacitor 24 to be switched into the circuit in parallel with the base capacitor 22 when there is a substantial voltage difference between the two. The operation described for FIG. 6 allows the charge and discharge cycles of trim capacitor 24 to be initiated only by action of natural commutation which is provided by diodes 142 and 146, at time points t2 and t4. This operation prevents the sudden discharge of current between base capacitor 22 and trim capacitor 24, which, if allowed, would lead to destructively high currents between the capacitors and the generation of undesirable radio frequency noise. It should be noted that it would be possible for control signals 130 and 132 to be other than simple complementary square waves, but such signals would need to provide conduction during the appropriate current conduction periods shown in FIG. 6 and prevent the trim capacitor 24 from being switched into the circuit at times when its voltage is different from the voltage of the base capacitor 22.

The outlined phase modulation technique effects pulse width modulation of the trim capacitor duty cycle and simultaneously provides for the trim capacitor charge and discharge cycles to initiate by natural commutation of, while preventing sudden discharge of current between the capacitors. This achieves an important object of this invention.

It will be noted that in the preferred embodiment it is not necessary for the control system to measure the high voltages across the inductive element 10 or the capacitive element 20. All timing signals are based on the (low voltage) phase measurements of the driving voltage and the current sense signals. Tuning command signals 130 and 132 are shown as simple digital optical signals. This arrangement can provide isolation between the control signals and the floating voltage supply for switch circuit 26.

One use for the disclosed series resonant circuit is in application to the excitation of the field of high frequency alternators. In this use the voltage output of the alternator is modulated at a desired frequency by controlled modulation of the magnetic field strength as disclosed by Tupper in U.S. Pat. No. 6,051,959.

Another use for the disclosed series resonant circuit is in application to inductive heating. In this application the inductive element of the series resonant circuit would be the combination of the field winding and the magnetically coupled eddy currents within the heated target piece. The ability to adapt the heater circuit to resonate at a frequency matching the power line excitation frequency would maximize the potential magnetic field strength and heating effect. The disclosed series resonant circuit provides for automatic compensation to account for varying inductive effects of various heated target pieces. The amplitude modulation control could be used to control the temperature of the heated target piece. The power factor of the tuned resonant circuit would be unity, which simplifies the connection to the power grid.

Although the invention has been described with respect to various embodiments, it should be realized that this invention is also capable of a wide variety of further and other embodiments within the spirit and scope of the appended claims

What is claimed is:

1. A series resonant circuit for storing or modulating magnetic field energy, the circuit comprising:
    a. an inductive element;
    b. a driving voltage source coupled in series with said inductive element;
    c. a series capacitive element coupled in series with said inductive element and said driving voltage source, wherein said series capacitive element includes a base capacitive element and a trim capacitive element; and
    d. a switch circuit coupled in series with said trim capacitive element such that said switch circuit and said trim capacitive element are coupled in parallel with said base capacitive element, wherein said switch circuit regulates the timing and direction of current through said trim capacitive element to tune a resonant response, or to control a natural frequency, of the resonant circuit.

2. The resonant circuit as claimed in claim 1 further comprising a controller coupled to said switch circuit such that a driving voltage supplied by said driving voltage source and a resulting current through the resonant circuit are in phase.

3. The resonant circuit as claimed in claim 2 wherein said controller regulates operation of said switch circuit to adjust a natural frequency of the resonant circuit to match an excitation frequency of said driving voltage source.

4. The resonant circuit as claimed in claim 3 wherein said controller regulates operation of said switch circuit by providing a tuning signal at said excitation frequency and wherein said tuning signal is phase modulated with respect to said driving voltage or said resultant current in a manner to:
    a. allow initiation of the discharging and charging of said trim capacitor element by natural commutation processes,
    b. prevent sudden discharge between said base capacitive element and said trim capacitive element, and
    c. change the effective capacitance of said series capacitive element in order to adjust a natural frequency of the resonant circuit to match an excitation frequency of said driving voltage source.

5. The resonant circuit as claimed in claim 3 further comprising a current sensor for sensing a resonant current of the resonant circuit, wherein said current sensor includes an output coupled to said controller.

6. The resonant circuit as claimed in claim 5 further comprising a resonant performance sensor for sensing one or more resonant performance parameters of a device associated with the resonant circuit, wherein said resonant performance sensor includes an output coupled to said controller, and wherein said controller operates to maintain the amplitudes of said performance parameters at given levels.

7. The resonant circuit as claimed in claim 6 wherein the one or more resonant performance parameters include stored energy, magnetic field strength, and electrostatic potential.

8. The resonant circuit as claimed in claim 1 wherein said driving voltage source includes a DC power source and an H-bridge commutation circuit.

9. The resonant circuit as claimed in claim 8 wherein said H-bridge commutation circuit includes a plurality of controllable solid-state switches.

10. The resonant circuit as claimed in claim 1 wherein said switch circuit includes a first terminal coupled to said driving voltage source and a second terminal coupled to said trim capacitive element, said switch circuit further comprising a first unidirectional conduction path and a second unidirectional conduction path coupled in anti-parallel between said terminals, wherein said first conduction path is supplied by a first enabling voltage source and said second conduction path is coupled to a second enabling voltage source.

11. The resonant circuit as claimed in claim 10 wherein said first conduction path includes a first diode device coupled in series with a first solid-state switch and said second conduction path includes a second diode device coupled in series with a second solid-state switch.

12. The resonant circuit as claimed in claim 11 wherein said first and second diode devices are diodes and said first and second solid-state switches are transistors, wherein the anode of said first diode is coupled to said second terminal and the anode of said second diode is coupled to said first terminal, and wherein a low-potential node of said second transistor is coupled to said second terminal a low-potential node of said first transistor is coupled to said first terminal.

13. The resonant circuit as claimed in claim 12 wherein said first enabling voltage source includes a first floating voltage source coupled in series with a first optically operated switch and a first resistance, and said second enabling voltage source includes a second floating voltage source coupled in series with a second optically operated switch and a second resistance, wherein a high-potential node of said first resistance is coupled to a gate or base of said first transistor and a low-potential node of said first resistance is connected to said first terminal, and wherein a high-potential node of said second resistance is coupled to a gate or base of said second transistor and a low-potential node of said second resistance is connected to said second terminal.

14. The resonant circuit as claimed in claim 13 wherein said first and second optically operated switch are phototransistors.

15. The resonant circuit as claimed in claim 1 wherein said switch circuit includes a first terminal coupled to said driving voltage source and a second terminal coupled to said trim capacitive element, said switch circuit further comprising a first unidirectional conduction path and a second unidirectional conduction path coupled in anti-parallel between said terminals, and wherein said first conduction path is supplied by a first enabling voltage source and said second conduction path is coupled to a second enabling voltage source.

16. The resonant circuit as claimed in claim 15 wherein said first conduction path includes a first diode device coupled in series with a first solid-state switch and said second conduction path includes a second diode device coupled in series with a second solid-state switch.

17. The resonant circuit as claimed in claim 16 wherein said first and second diode devices are diodes, said first solid-state switch is a transistor and said second solid-state switch is a complementary transistor, wherein the anode of said first diode and the cathode of said second diode are coupled to said second terminal, and wherein a low-potential node of said first transistor and a high-potential node of second transistors are coupled to said first terminal.

18. The resonant circuit as claimed in claim 17 wherein said first and second enabling voltage sources are arranged to be naturally charged by said driving voltage source during some portions of a driving voltage operational cycle and wherein said first and second enabling voltage sources can provide continuous enabling voltage to said paths.

19. The resonant circuit as claimed in claim 18 wherein:
a. said first enabling voltage source includes a first supply capacitor coupled at a low-potential node to said first terminal, and connected at a high-potential node to the anode of a first supply diode, and wherein the cathode of said first supply diode is connected in series with a first current limiting resistor, and wherein said first enabling voltage source is connected in parallel across said driving voltage source, and wherein said high-potential node of said first supply capacitor is also coupled with a first optically operated switch in series with a first series resistance, and wherein a high-potential node of said first series resistance is coupled to a gate or base of said first transistor and a low-potential node of said first series resistance is connected to said first terminal, wherein said second enabling voltage source includes a second supply capacitor coupled at a high potential end to said first terminal and connected at a low-potential node to the cathode of a second supply diode, and wherein the anode of said second supply diode is connected in series with a second current limiting resistor; and wherein said second enabling voltage source is connected in parallel across said driving voltage source; and wherein said low-potential node of said second supply capacitor is also connected with a second optically operated switch in series with a second series resistance, and wherein a low-potential node of said second series resistance is coupled to a gate or base of said second transistor and a high-potential node of said second series resistance is connected to said first terminal.

20. The resonant circuit as claimed in claim 2 wherein said controller includes means for receiving a reference frequency signal to establish the desired operating frequency of the resonant circuit.

21. The resonant circuit as claimed in claim 20 wherein said controller further includes means to generate a corrective square wave signal and its complement for input to said switch controller.

22. The resonant circuit as claimed in claim 21 wherein said controller further includes means for generating a square wave of desired frequency and its complement for input to said driving voltage source, and wherein said controller further includes means to transmit a modulated pulse width train and its complement to said driving voltage source.

23. The resonant circuit as claimed in claim 6 wherein said inductive element is a field winding of a high frequency alternator and wherein said resonant performance parameter is an output voltage of said alternator modulated at said excitation frequency.

24. The resonant circuit as claimed in claim 6 wherein said inductive element is a field coil of an induction heater and wherein said resonant performance parameter is a temperature response of a heated target piece.

* * * * *